United States Patent
Antonov et al.

(10) Patent No.: US 8,775,672 B2
(45) Date of Patent: Jul. 8, 2014

(54) ARCHITECTURE FOR SIMULATION OF NETWORK CONDITIONS FOR VIDEO DELIVERY

(75) Inventors: Lyudmil Vladimirov Antonov, Seattle, WA (US); Andrew Sherman Carter, Sammamish, WA (US); Daniel Honig Bear, Seattle, WA (US); William Zachary Patrick Holt, Seattle, WA (US)

(73) Assignee: Hulu, LLC, Santa Monica, CA (US)

( * ) Notice: Subject to any disclaimer, the term of this patent is extended or adjusted under 35 U.S.C. 154(b) by 129 days.

(21) Appl. No.: 13/495,998

(22) Filed: Jun. 13, 2012

(65) Prior Publication Data

US 2013/0340022 A1    Dec. 19, 2013

(51) Int. Cl.
*G06F 15/173* (2006.01)

(52) U.S. Cl.
USPC ............................ 709/238; 709/223; 709/224

(58) Field of Classification Search
USPC .......................................... 709/238, 223–224
See application file for complete search history.

(56) References Cited

U.S. PATENT DOCUMENTS

| | | | | |
|---|---|---|---|---|
| 7,653,006 | B1 * | 1/2010 | Marino et al. ................ | 370/252 |
| 2004/0213155 | A1 * | 10/2004 | Xu et al. ...................... | 370/232 |
| 2005/0108430 | A1 * | 5/2005 | Howarth et al. .............. | 709/245 |
| 2008/0008202 | A1 * | 1/2008 | Terrell et al. ................. | 370/401 |
| 2008/0112312 | A1 * | 5/2008 | Hermsmeyer et al. ....... | 370/228 |
| 2009/0080328 | A1 * | 3/2009 | Hu et al. ....................... | 370/230 |
| 2010/0095367 | A1 * | 4/2010 | Narayanaswamy ........... | 726/12 |
| 2010/0180316 | A1 * | 7/2010 | Hasegawa et al. ............ | 725/118 |
| 2010/0250717 | A1 * | 9/2010 | Akagi ........................... | 709/221 |
| 2010/0257598 | A1 * | 10/2010 | Demopoulos et al. ......... | 726/13 |
| 2012/0026871 | A1 * | 2/2012 | Hu et al. ....................... | 370/230 |
| 2012/0124179 | A1 * | 5/2012 | Cappio et al. ................ | 709/219 |
| 2012/0163376 | A1 * | 6/2012 | Shukla et al. ................ | 370/388 |
| 2013/0305274 | A1 * | 11/2013 | Gavita et al. ................. | 725/25 |
| 2013/0339500 | A1 | 12/2013 | Antonov | |

* cited by examiner

*Primary Examiner* — Waseem Ashraf
(74) *Attorney, Agent, or Firm* — Brian N. Young; Fountainhead Law Group P.C.

(57) ABSTRACT

In one embodiment, a method includes retrieving a playlist for a video stream of video content for a client. The playlist is for portions of video content for the video stream. A traffic shaping service determines a set of rules for the playlist for a set of portions in the plurality of portions where each rule is associated with a network condition. For each rule, the method performs: dynamically allocating a port and setting a network condition to apply to the port according to the rule. During playback of the video content, the traffic shaping service receives a request for a portion from the client and determines a port associated with the request for the portion. The method then sends a traffic shaped portion through the determined port where the network condition is applied to the traffic shaped portion based on the network condition being set on the port.

20 Claims, 7 Drawing Sheets

ARCHITECTURE FOR SIMULATION OF NETWORK CONDITIONS FOR VIDEO DELIVERY

BACKGROUND

Delivery of video content is available through a mobile device or other living room-connected devices, such as personal computers. Different protocols may be used to stream the video. One protocol is hypertext transfer protocol (HTTP) live streaming (HLS). The HLS protocol delivers video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

Different device platforms usually have different media players, which each may have their own implementation of the HLS protocol. The different implementations may affect the quality of a viewing experience and determine whether video playback is uninterrupted. For example, the different protocol implementations may differ in how much of the HLS protocol is implemented, but also in the heuristics used in streaming and bitrate switching (e.g., how switching on a segment-by-segment basis between bitrates is performed). The differences in implementation may be noticeable when sudden changes in the stability of the network occur, when playing video content on low-bandwidth networks, or when partial failures of the infrastructure delivering the video occur.

It is desirable to provide the best viewing experience possible, irrespective of network conditions. Reproducing the client environment (e.g., the network conditions, client device, video played) may be used to test how a media player reacts when the network conditions occur. For example, reproducing the client environment is helpful in determining the root cause of a problem. Different solutions may be determined based on the reproduced environment, such as issues with the client or the media player may be determined. Without reproducing the problems, it may be hard to determine how to fix the problem.

In one example, reproducing a problem may be performed via hardware configuration. For example, a network device is set such that all traffic flowing through the network device produces a desired network condition, such as all traffic sent through the network device may be delayed. Setting the conditions on the hardware may produce the network conditions; however, changing the hardware implementation of a network device may be time-consuming and inconvenient. Additionally, all traffic flowing through the hardware device is affected.

SUMMARY

In one embodiment, a method includes retrieving a playlist for a video stream of video content for a client. The playlist is for a plurality of portions of video content for the video stream. A traffic shaping service determines a set of rules for the playlist for a set of portions in the plurality of portions where each rule is associated with a network condition. For each rule, the method performs: dynamically allocating a port and setting a network condition to apply to the port according to the rule. During playback of the video content at the client, the traffic shaping service receives a request for a portion in the set of portions from the client and determines a port associated with the request for the portion. The method then sends a traffic shaped portion through the determined port where the network condition is applied to the traffic shaped portion based on the network condition being set on the port.

In one embodiment, a non-transitory computer-readable storage medium is provided containing instructions, that when executed, control a computer system to be configured for: retrieving a playlist for a video stream of video content for a client, wherein the playlist is for a plurality of portions of video content for the video stream; determining, at a traffic shaping service, a set of rules for the playlist for a set of portions in the plurality of portions, wherein each rule is associated with a network condition; for each rule, performing: dynamically allocating a port; and setting a network condition to apply to the port according to the rule; during playback of the video content at the client, receiving, at the traffic shaping service, a request for a portion in the set of portions from the client; determining a port associated with the request for the portion; and sending a traffic shaped portion through the determined port, wherein the network condition is applied to the traffic shaped portion based on the network condition being set on the port.

In one embodiment, a system is provided comprising: one or more computer processors; and a computer-readable storage medium comprising instructions, that when executed, control the one or more computer processors to be configured for: retrieving a playlist for a video stream of video content for a client, wherein the playlist is for a plurality of portions of video content for the video stream; determining, at a traffic shaping service, a set of rules for the playlist for a set of portions in the plurality of portions, wherein each rule is associated with a network condition; for each rule, performing: dynamically allocating a port; and setting a network condition to apply to the port according to the rule; during playback of the video content at the client, receiving, at the traffic shaping service, a request for a portion in the set of portions from the client; determining a port associated with the request for the portion; and sending a traffic shaped portion through the determined port, wherein the network condition is applied to the traffic shaped portion based on the network condition being set on the port.

The following detailed description and accompanying drawings provide a better understanding of the nature and advantages of the present invention.

DETAILED DESCRIPTION

Described herein are techniques for a traffic shaping system for simulating network conditions. In the following description, for purposes of explanation, numerous examples and specific details are set forth in order to provide a thorough understanding of embodiments of the present invention. Particular embodiments as defined by the claims may include some or all of the features in these examples alone or in combination with other features described below, and may further include modifications and equivalents of the features and concepts described herein.

Traffic Shaping Overview

Figure 1:
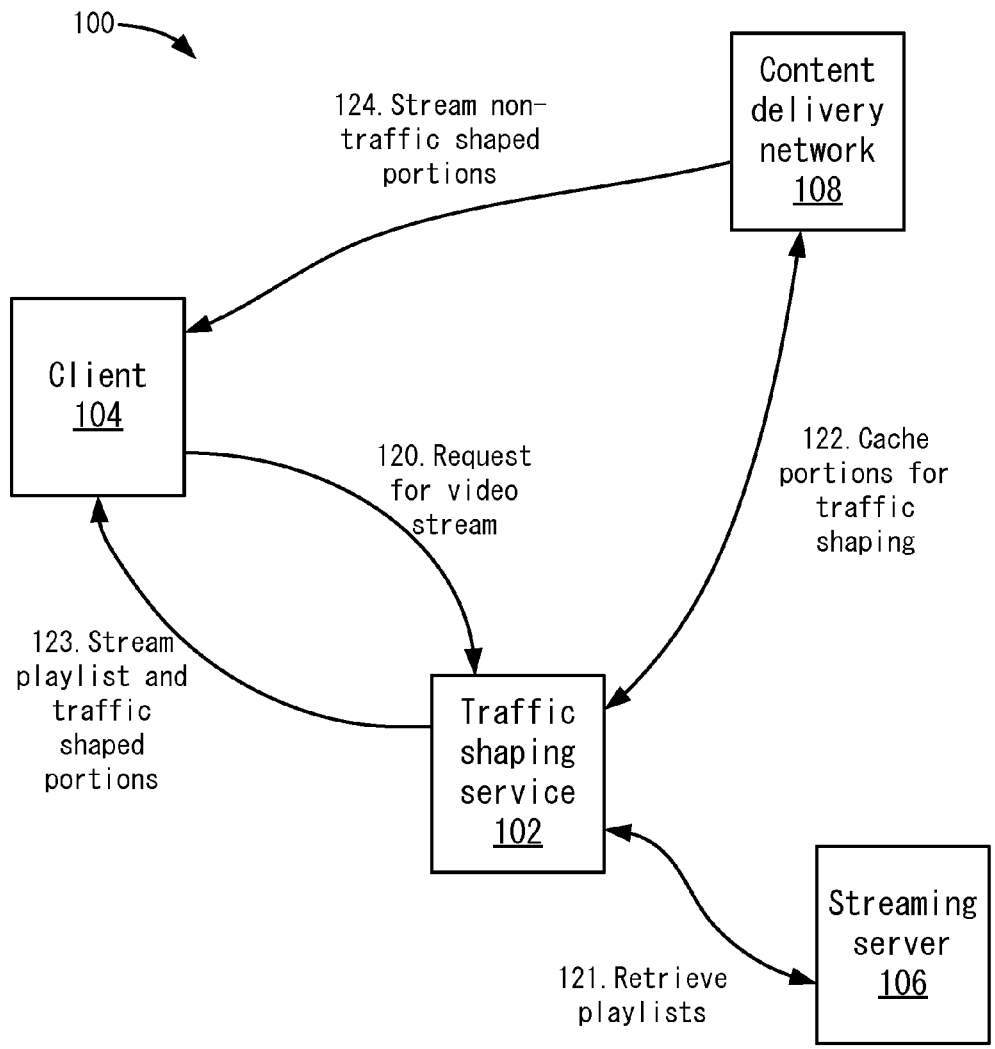
FIG. 1 depicts a simplified system for traffic-shaping of video content according to one embodiment.

FIG. 1 depicts a simplified system 100 for traffic-shaping of video content according to one embodiment. System 100 includes a traffic-shaping service 102, a client 104, a streaming server 106, and a content delivery network (CDN) 108. Functions performed by some entities in system 100 may be distributed to other entities. For example, streaming server 106 may be part of content delivery network 108. Also, multiple instances of entities in system 100 may be provided, such as multiple content delivery networks 108.

Client 104 may include a media player that can play a video. Also, although video content is discussed as being streamed, other content may be streamed, such as audio, text, pictures, etc. Examples of client 104 include mobile devices, such as smartphones, and living room-connected devices, such as game consoles, set top boxes, personal computers, and laptop computers.

The media player may use a content delivery protocol, such as HTTP live streaming (HLS) or progressive download. A video stream may be delivered using any of these protocols. Other protocols may also be used. At 120, client 104 may request a video stream of video content from traffic-shaping service 102. For example, traffic-shaping service 102 may appear as an HLS endpoint that can be used by client 104, or any other HLS client. In one example, the request is sent via an identifier, such as a uniform resource locator (URL), to traffic-shaping service 102. Also, as will be discussed in more detail below, the request may include a set of rules that are used for traffic-shaping the video stream.

Traffic-shaping service 102 is coupled to streaming server 106, which provides a playlist for the video content for the video stream at 121. For example, the video content may include multiple portions. For example, every 10 seconds of video may form a portion. In one embodiment, the portion may be a segment if HLS is being used and a byte range if progressive download is being used. The playlist includes information that allows client 104 to request each portion. For example, each portion may be associated with a URL that is used to request the portion from content delivery network 108. When traffic-shaping service 102 requests the playlist, streaming server 106 sends the playlist to traffic-shaping service 102.

Traffic-shaping service 102 provides traffic-shaping that can simulate network conditions. For example, network conditions can be simulated to re-create the environment in which problems were encountered with respect to a media player receiving a video stream. The traffic shaping may be performed without instrumenting hardware of the network infrastructure (i.e., a hardware device, such as a server, does not have hardware changed to operate differently). Rather, as will be described below, the network conditions are simulated via software on a per portion basis via traffic shaping service 102. For example, when a portion is encountered in which a network condition should be simulated, traffic-shaping service 102 performs the traffic-shaping for that portion at 123. In one example, if the network condition is a delay in sending the portion, traffic-shaping service 102 may simulate the delay in sending by delaying the sending of the portion to client 104. In another example, if an error is to be simulated, then traffic-shaping service 102 may send an error code to client 104 for the portion. When traffic shaping is not needed, content delivery network 108 delivers the portions normally at 124. The network may be monitored when operating under the simulated conditions and solutions to make streaming more reliable and resistant to failures may be determined.

In one embodiment, traffic-shaping service 102 may be included on a same network as client 104. This may avoid deviations in network quality between traffic-shaping service 102 and client 104. However, traffic-shaping service 102 may be located on a remote network, such as in a remote cloud service network, where requests and data are sent through a wide area network (WAN).

To perform the traffic-shaping, traffic-shaping service 102 may alter the playlist that was received from streaming server 106. The altering of the playlist causes client 104 to request certain portions that are not traffic-shaped from content delivery network 108 and portions that are going to be traffic-shaped from traffic-shaping service 102. Although non-traffic-shaped portions are described as being delivered normally from content delivery network 108, the non-traffic shaped portions may be delivered from traffic shaping service 102 to client 104.

Client 104 requests each portion using a URL on the playlist. For example, each portion is associated with a different URL. When a non-traffic shaped portion is requested, the request goes to content delivery network 108. However, when a portion that is to be traffic-shaped is encountered, client 104 requests that portion from traffic shaping service 102 using the URL in the playlist where the URL directs the request to traffic-shaping service 102. As will be described in more detail below, traffic-shaping service 102 may have received the requested portion from content delivery network 108 and cached that portion. Traffic-shaping service 102 then performs traffic-shaping for the portion. For example, as described above, a delay may be simulated or an error code may be sent. In other embodiments, traffic-shaping service 102 may proxy the requested portion from content delivery network 108 without caching and performed the traffic shaping.

Although traffic shaping is performed, particular embodiments do not affect the operation of client 104. For example, client 104 normally requests portions using a playlist. Because the operation of requesting portions is not changed, streaming client 104 may not know that traffic-shaping is being performed. Rather, streaming client 104 requests the portions using the URLs in the playlist as is normally provided for in the HLS protocol.

Figure 2:
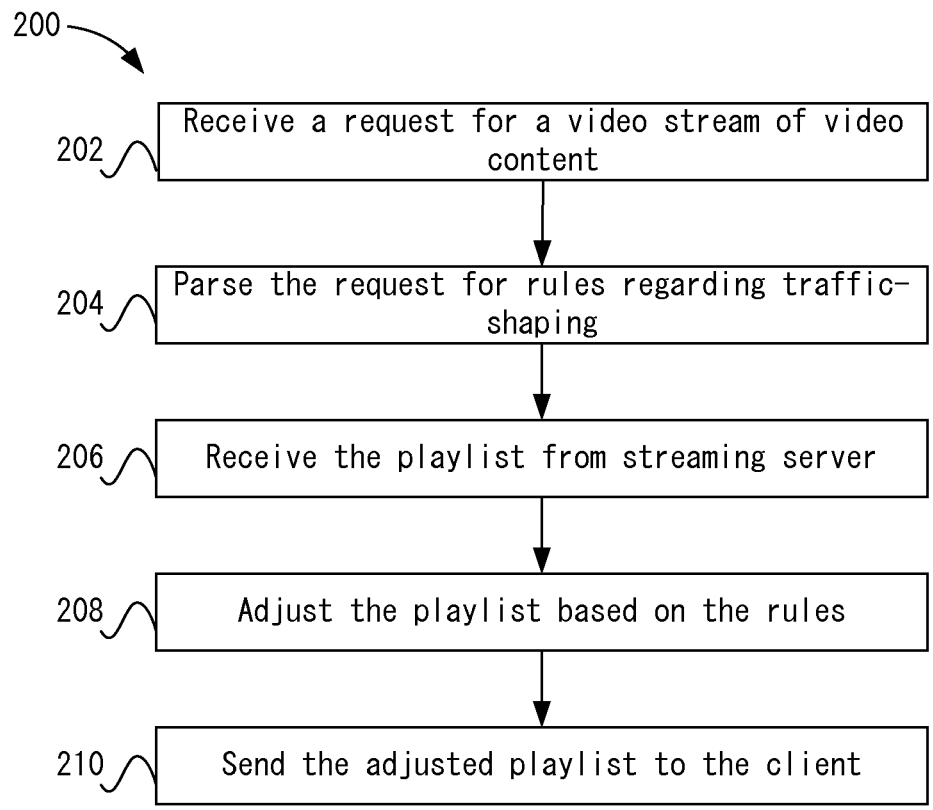
FIG. 2 depicts a simplified flowchart of a method for adjusting a playlist according to one embodiment.

FIG. 2 depicts a simplified flowchart 200 of a method for adjusting a playlist according to one embodiment. At 202, traffic-shaping service 102 receives a request for a video stream of video content. For example, the request may be a URL that is directed to traffic-shaping service 102. Because traffic-shaping service 102 appears as an endpoint, additional provisioning to request the video stream at client 104 may not be needed if the device supports the delivery protocol.

At 204, traffic-shaping service 102 parses the request for rules regarding traffic-shaping. For example, the URL may include parameters defining a set of rules. The rules may also be provided in other ways. For example, the rules may be stored and retrieved based on a request. In one example, the rules may be provided in a query string of the URL and control how the stream will be traffic-shaped. In one embodiment, the URL may be in the following format:

http://<driplshost>/
master.m3u8?authkey=<authkey>&cid=<cid>&
[r=<rule-expression>~<action> ... ]

The rules are defined in the section r=<rule-expression>~<action>. An actual URL may be represented as:

http://<driplshost>/
        master.m3u8?authkey=<authkey>&cid=<cid>&
        [r=<650k~e404, 1500k*~e500,cdn1.*.s2~net10loss1]

In the above example, the requested video stream is denoted by a content ID (cid) for the video content. The traffic-shaping that is to be performed is that an error code, such as an HTTP error code 404, for the variant playlist encoded at 650 kbit/s bitrate should be returned, and also a second error code, such as an HTTP error code 500, should be returned for all video portions in the 1500 kbit/s bitrate playlist. Additionally, portion 2 from a first content delivery network 108 in all variant bitrate playlists will be transmitted back at 10 kb/s with a 1% packet loss.

At 206, traffic-shaping service 102 receives the playlist from streaming server 106. The received playlist may be the standard playlist that requests portions from CDN 108.

At 208, traffic-shaping service 102 adjusts the playlist based on the rules. For example, for specific portions that are going to be traffic-shaped, the URL for the specific portions is replaced such that the specific portions are requested from traffic-shaping service 102. Further, information in the new URL is included such that the network condition to be traffic-shaped is identified for that portion as will be described in more detail below. At 210, traffic-shaping service 102 sends the adjusted playlist to client 104.

Figure 3:
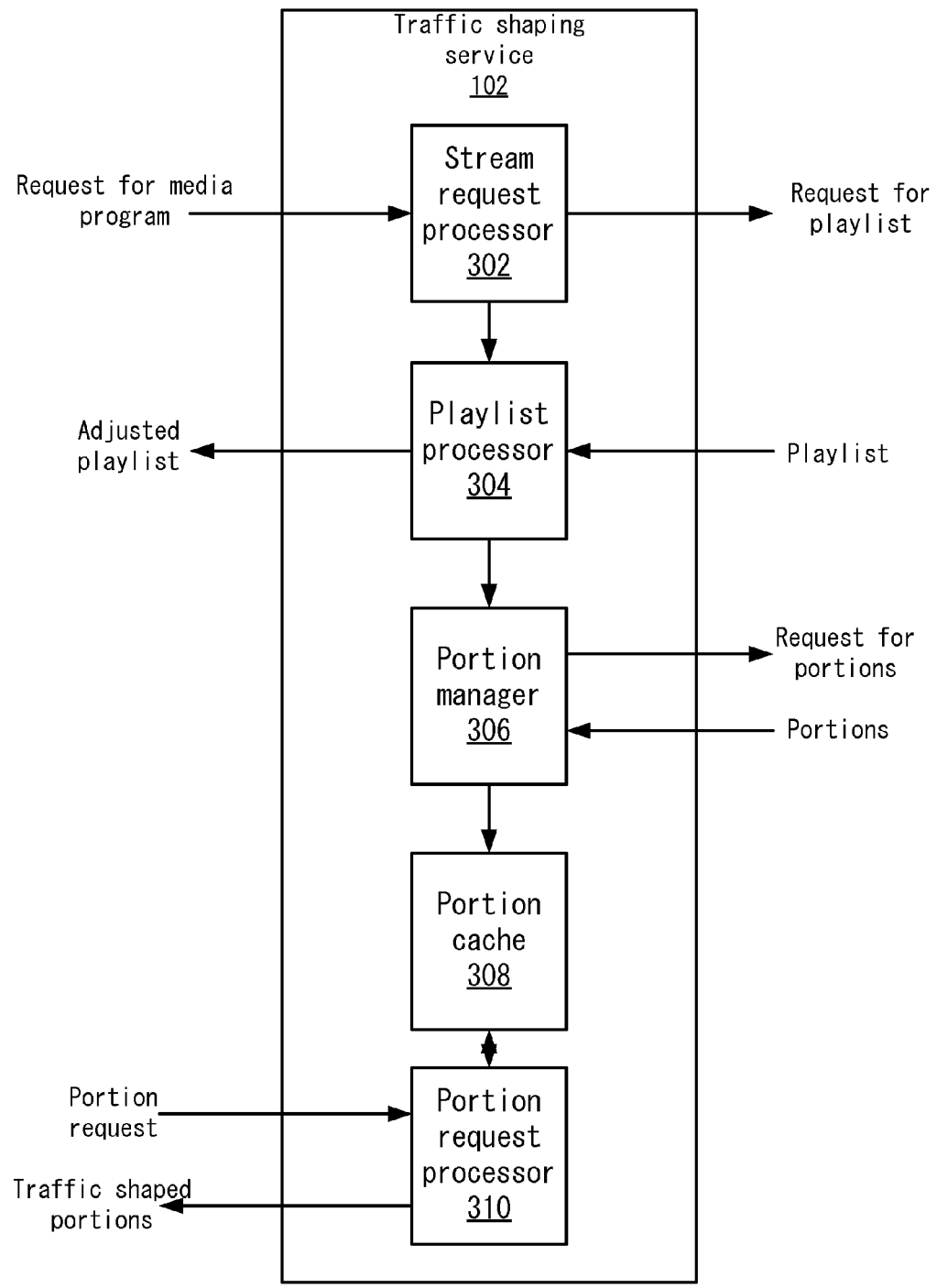
FIG. 3 depicts a more detailed example of a traffic-shaping service according to one embodiment.

FIG. 3 depicts a more detailed example of traffic-shaping service 102 according to one embodiment. For example, traffic-shaping service 102 may be included on one or more servers as will be described in more detail below. A stream request processor 302 receives a video stream request from client 104. Stream request processor 302 then requests the playlist from streaming server 106.

A playlist processor 304 then adjusts the playlist according to the rules included in the request. For example, playlist processor 304 parses the video stream request and determines the rules. For the portions that are to be traffic-shaped, playlist processor 304 replaces the URL in the playlist as described above. Playlist processor 304 then sends the adjusted playlist to client 104.

In one embodiment, different rule classes may be provided. For example, a first class results in direct re-writes of URLs in the playlist to specific URLs that raise a specified HTTP error code. The second class results in caching a portion for the network condition and transmitting the portion under the specified network conditions of the rule. Thus, for the second class, a portion manager 306 requests portions from CDN 108 that are going to be traffic-shaped under specified network conditions. When portion manager 306 receives the portions from CDN 108, portion manager 306 stores the portions in a portion cache 308. For the first rule class, the portions that will raise error codes may not be requested from CDN 108 and not cached.

A portion request processor 310 then receives portion requests from client 104 when client 104 plays back the video stream. For example, when a portion that is to be traffic-shaped is encountered in the playlist, streaming client 104 requests the URL that points to traffic-shaping service 102. Portion request processor 310 receives the request and determines the rule for traffic-shaping. If the rule is to return a specified error code, then portion request processor 310 returns the error code as the traffic-shaped portion. If the rule is to apply a specified network condition, portion request processor 310 retrieves the portion from portion cache 308. Then, portion request processor 310 applies the network condition to the portion. For example, the portion may be transmitted back to client 104 with a 1% packet loss at a specified bitrate.

Accordingly, different network conditions can be simulated using traffic-shaping service 102. For example, traffic-shaping service 102 allows the simulation of a sudden network drop that will cause the video playback to "stall". Also, traffic-shaping service 102 can simulate missing portions that will cause the playback to "skip" or simulate a mid-stream content delivery network failure, thus exercising content delivery network fallback scenarios. Traffic-shaping service 102 may also serve portions as if they were transmitted on a low bandwidth or lossy network. A user can then monitor how client 104 reacts to the network conditions and determine how streaming can be made more reliable or resistant to failures.

Traffic Shaping Architecture

Figure 4:
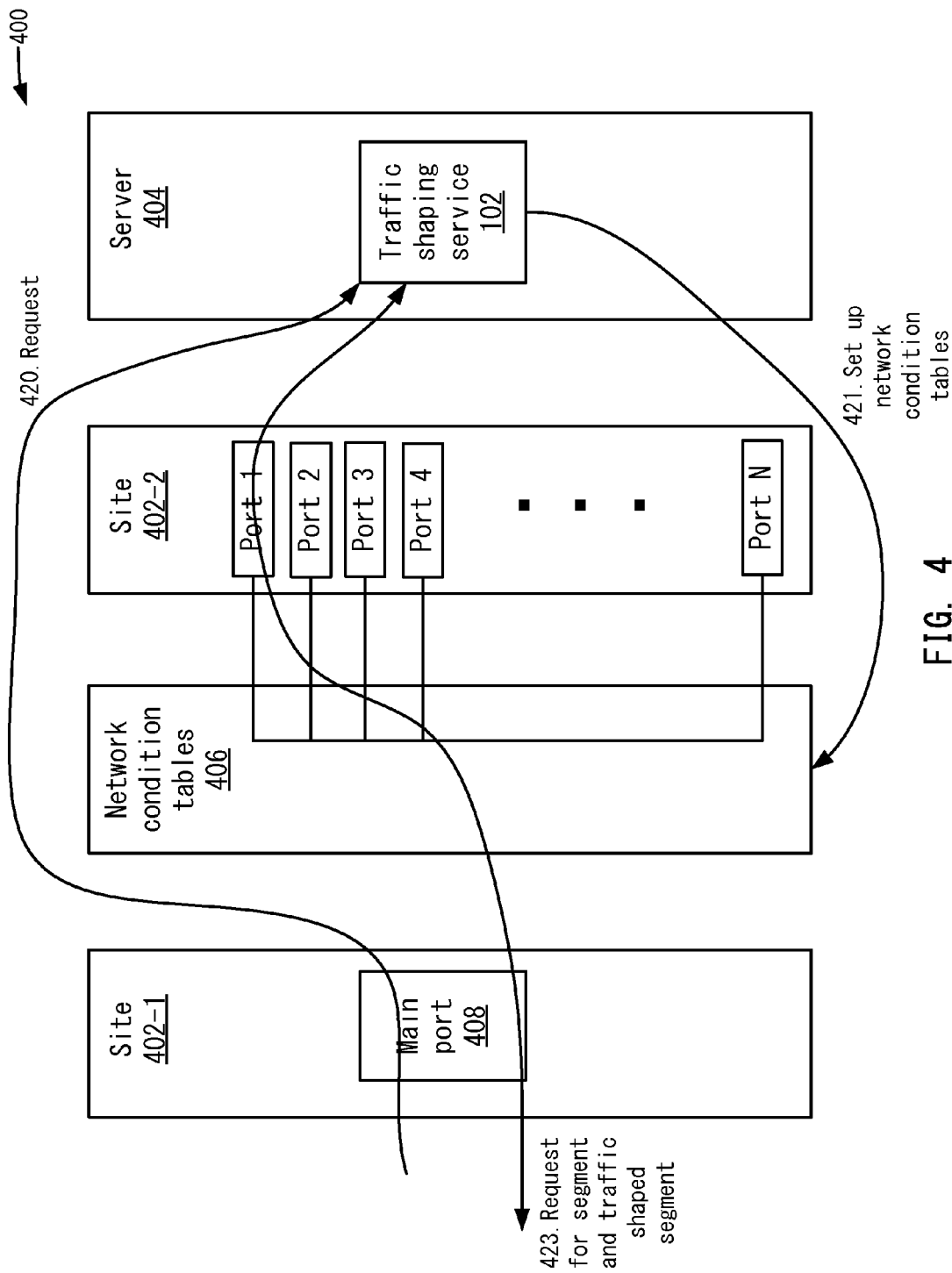
FIG. 4 depicts an architecture for providing the traffic-shaping service according to one embodiment.

Different architectures may be used to perform the traffic shaping. FIG. 4 depicts an architecture 400 for providing the traffic-shaping service according to one embodiment. System 400 includes a first site 402-1, a second site 402-2, a server 404, and network condition tables 406. Different entities described in system 400 may be implemented on different computing devices or on a single machine. For example, site 402-1 and site 402-2 may be sites that proxy between each other, and may be located on different servers or may be found on the same server.

First site 402-1 may be an nginx site that is situated on a server that serves as a proxy server. First site 402-1 includes a main port 408, such as port 80, in which communications from clients 104 are received and communications to clients 104 are sent through. In one embodiment, all communication is sent through main port 408. Main port 408 is a port that may always be available for communication for client 104. At 420, first site 402-1 receives a first request for a video stream and sends the request to server 404. Traffic-shaping service 102 can then request the playlist for the video stream as described above.

Traffic-shaping service 102 then can set up the traffic-shaping. For example, at 421, traffic-shaping service 102 executes a script that sets network condition information in network condition tables 406. For example, network condition information may be set in internet protocol (IP) tables, a LINUX kernel module (netem), and traffic control (TC) information. As will be described below, the network conditions apply to a specific port found in second site 402-2. For example, for each rule that is being applied, a port in second site 402-2 is dynamically allocated. A portion that is being traffic shaped according to the rule is then sent through the traffic shaped port and traffic shaped according to the applicable network conditions. By executing the script, the conditions are set in tables 406.

Figure 5:
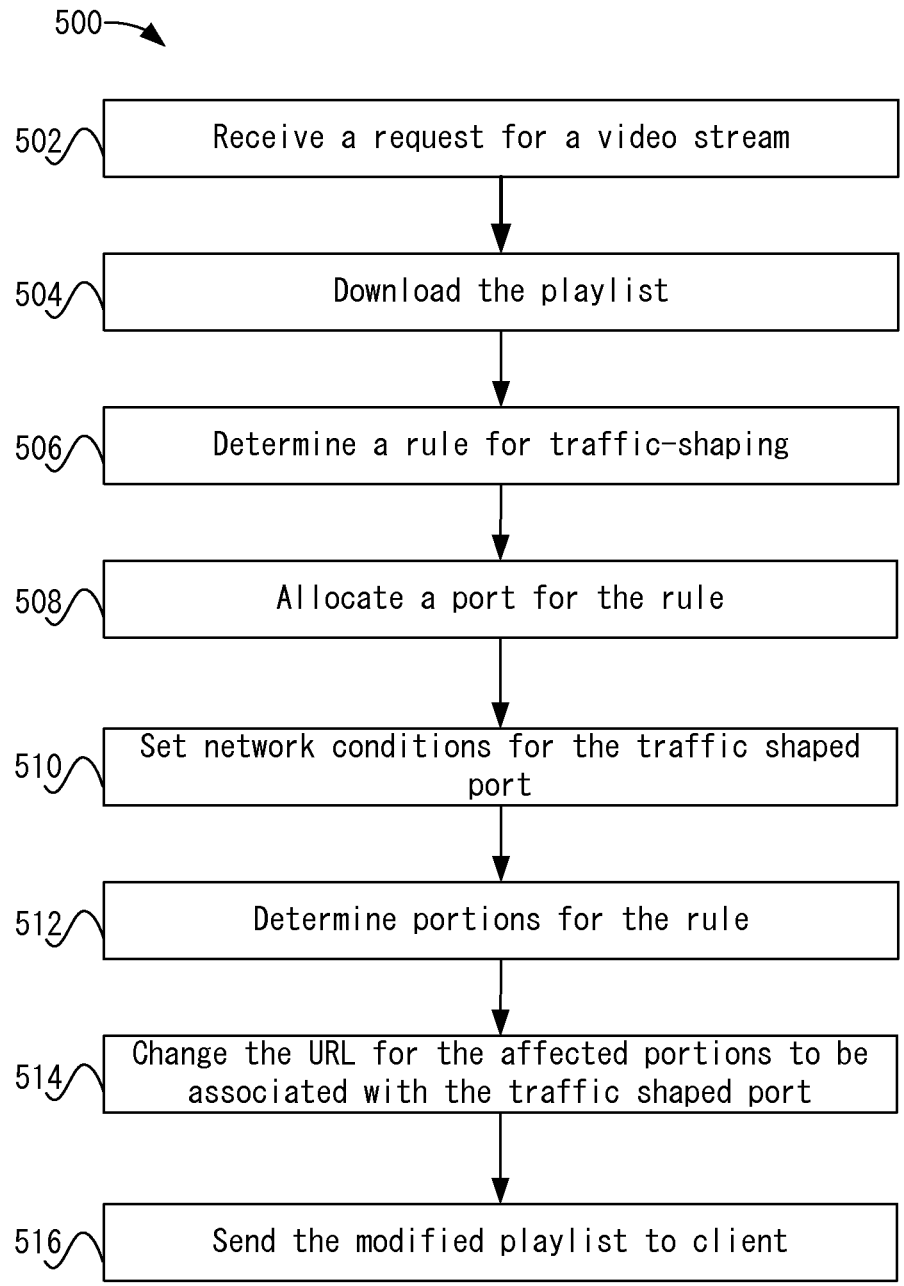
FIG. 5 depicts a simplified flowchart of a method for setting network condition information for traffic-shaping according to one embodiment.

FIG. 5 depicts a simplified flowchart 500 of a method for setting network condition information 406 for traffic-shaping according to one embodiment. At 502, traffic-shaping service 102 receives a request for a video stream. At 504, traffic-shaping service 102 downloads the playlist.

At 506, traffic-shaping service 102 determines a rule for traffic-shaping. For example, the request may have included multiple rules that need to be applied. At 508, traffic-shaping service 102 allocates a port for the rule. For example, for each rule that sets a network condition for traffic-shaping, a traffic shaped port is dynamically allocated for that rule. Thus, any portions that the rule applies to may be sent to that traffic shaped port. In one embodiment, a traffic shaped port is allocated for each rule that is used.

At 510, traffic-shaping service 102 sets network conditions for the traffic shaped port. For example, traffic-shaping service 102 executes a script that sets network condition information in tables 406. In one example, the IP tables may be set and applied to the traffic shaped port in 508. The setting of the IP tables achieves the desired traffic-shaping for the traffic shaped port.

At 512, traffic-shaping service 102 determines portions for the rule. For example, multiple portions may be associated with the rule. In one example, every portion associated with a 1500 kbit/s bitrate playlist may be affected by the rule.

At 514, traffic-shaping service 102 changes the URL for the affected portions to be associated with the traffic shaped port. For example, the port identifier for the traffic shaped port is inserted into the URL for the portions in the playlist. When a request for the portion is received, site 402-1 determines the identifier for the traffic shaped port in the URL for the affected portions, and the portions may be sent through the traffic shaped port. At 516, traffic-shaping service 102 sends the modified playlist to client 104.

Referring back to FIG. 4, traffic-shaping service 102 changes the playlist as described above such that a request for a portion that is going to be traffic-shaped is received through main port 408. Also, the request may identify the traffic shaped port. At 423, when the request is received, main port 408 then determines the traffic shaped port in site 402-2 that is associated with the request to traffic shaping service 102 for the portion and sends the request through that traffic shaped port. Traffic-shaping service 102 then provides the traffic-shaped portion through the appropriate traffic shaped port. For example, the traffic shaped port is traffic-shaped by network condition tables 406, and thus the information sent by traffic-shaping service 102 through the traffic shaped port adheres to the traffic-shaping information set in tables 406. In one example, the portion that is sent through the traffic-shaped port may be sent through at a certain bitrate. Also, an error code may be sent through the port in site 402-2 instead of the data. The traffic-shaped portion is then sent through the traffic shaped port through main port 408.

Figure 6:
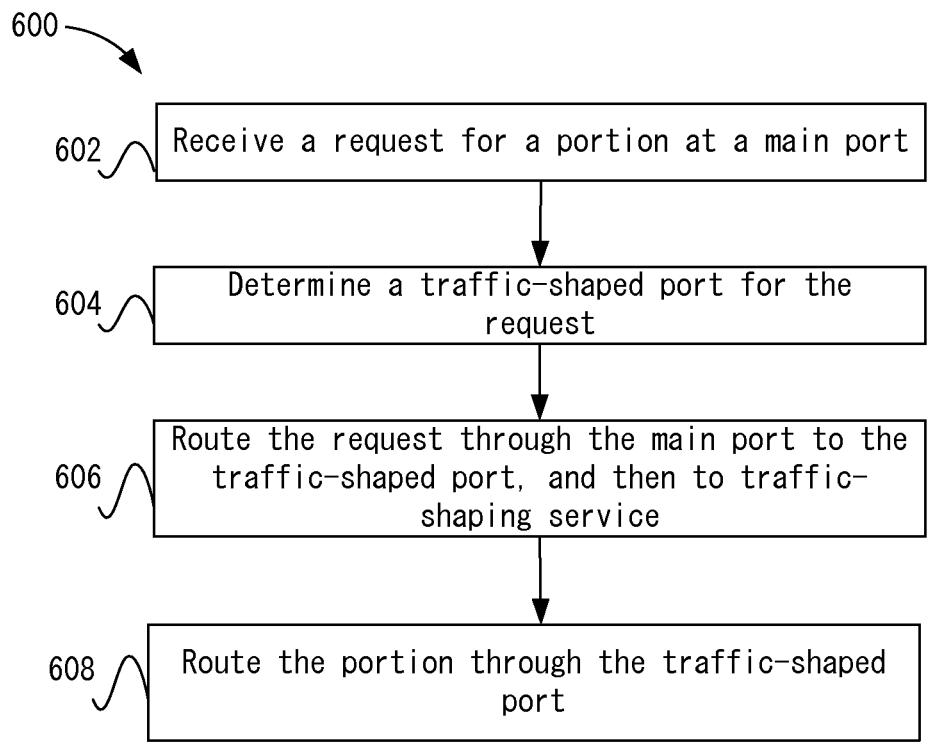
FIG. 6 depicts a simplified flowchart of a method for processing requests for portions according to one embodiment.

FIG. 6 depicts a simplified flowchart 600 of a method for processing requests for portions according to one embodiment. The requests are received after traffic shaping service 102 sends the modified playlist to client 104. At 602, first site 402-1 receives a request for a portion at main port 408. For example, all requests for a portion from client 104 are received at main port 408. By using main port 408, such as port 80, it is assured that a port is available for requests for portions because main port 408 is always available.

At 604, a traffic-shaped port is determined for the request. For example, the dynamically-allocated port for a rule may be identified in the request, such as in the URL.

At 606, the request is routed through main port 408 to the traffic-shaped port, and then to traffic-shaping service 102. At 608, traffic-shaping service 102 routes the portion through the traffic-shaped port. When the data is routed through the traffic-shaped port, the network condition information in tables 406 is applied to traffic-shape the portion. This makes sure that any data sent through the traffic-shaped port has the network conditions applied.

Figure 7:
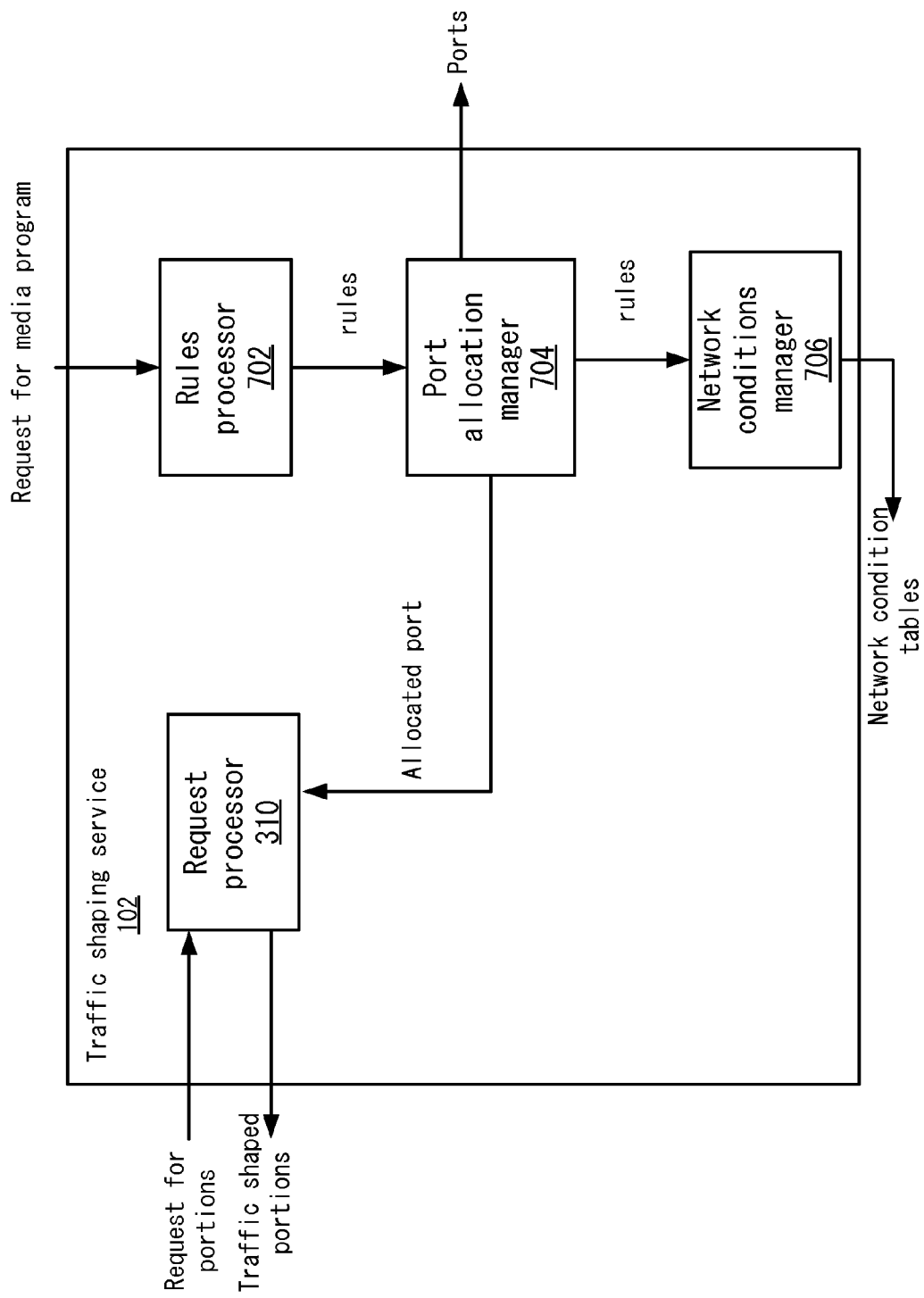
FIG. 7 depicts a more detailed example of the traffic-shaping service according to one embodiment.

FIG. 7 depicts a more detailed example of traffic-shaping service 102 according to one embodiment. A rules processor 702 receives the request for the video stream. Rules processor 702 parses the request to determine the applicable rules. The rules are then sent to a port allocation manager 704 and a network conditions manager 706.

Port allocation manager 704 allocates a traffic-shaped port. For example, for each rule, a traffic-shaped port is dynamically-allocated. Network conditions manager 706 sets network condition information in tables 406. For example, traffic control, IP tables, and the kernel are configured such that the traffic-shaping information is associated with the traffic-shaped port. Request processor 310 then receives requests for portions and sends portions through the traffic-shaped port.

Particular embodiments provide many advantages. For example, traffic-shaping service 102 may be used without adjusting the operation of the hardware of the network. Additionally, a variety of scenarios may be tested because the tests are performed using software, and not network hardware. Also, the traffic-shaping of streams is simplified because software is used to perform the traffic-shaping.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

What is claimed is:

1. A method comprising:
   retrieving a playlist for a video stream of video content for a client, wherein the playlist is for a plurality of portions of video content for the video stream;
   determining, at a traffic shaping service, a set of rules for the playlist for a set of portions in the plurality of portions, wherein each rule is associated with a respective network condition to simulate operation of a computing device with the respective network condition via software simulation without instrumenting hardware of the computing device to operate differently to provide the respective network condition;
   for each rule, performing:
      dynamically allocating a port; and
      setting a network condition to apply to the port according to the rule, wherein any portion sent through the port has the network condition simulated to simulate operation of the computing device with the network condition;
   during playback of the video content at the client, receiving, at the traffic shaping service, a request for a portion in the set of portions from the client;
   determining a port associated with the request for the portion; and
   sending the portion through the determined port, wherein the network condition is applied to the portion via the software simulation to simulate operation of the computing device with the network condition.

2. The method of claim 1, wherein setting the network condition comprises:

storing information indicating the network condition to apply to the port, wherein the stored information is used when sending the portion through the port.

3. The method of claim 2, wherein storing information comprises running a script to set the network condition in a routing table associated with the port.

4. The method of claim 1, further comprising:
for each of the set of portions, performing:
determining a rule associated with a portion; and
adjusting the playlist to identify the dynamically allocated port associated with the rule for the portion; and
sending the adjusted playlist to the client.

5. The method of claim 4, wherein:
the request for the portion received at the traffic shaping service identifies the port associated with the rule to apply to the portion, and
the service sends the portion through the identified port based on the port being identified in the request for the portion.

6. The method of claim 1, further comprising:
requesting a first set of portions from the set of portions from a content delivery network;
receiving the first set of portions from the content delivery network; and
sending the first set of portions through determined ports, wherein the first set of portions are sent from the traffic shaping service to the client and a second set of portions not in the first set of portions is sent to the client from the content delivery network without being sent to the traffic shaping service.

7. The method of claim 6, wherein the second set of portions do not have a respective network condition simulated via the software simulation.

8. The method of claim 6, wherein a portion in the first set of portions is associated with a rule that returns an error code instead of the portion.

9. The method of claim 1, wherein receiving the request comprises receiving the request at a main port, wherein the main port proxies the request to the port associated with the request.

10. A non-transitory computer-readable storage medium containing instructions, that when executed, control a computer system to be configured for:
retrieving a playlist for a video stream of video content for a client, wherein the playlist is for a plurality of portions of video content for the video stream;
determining, at a traffic shaping service, a set of rules for the playlist for a set of portions in the plurality of portions, wherein each rule is associated with a respective network condition to simulate operation of a computing device with the respective network condition via software simulation without instrumenting hardware of the computing device to operate differently to provide the respective network condition;
for each rule, performing:
dynamically allocating a port; and
setting a network condition to apply to the port according to the rule, wherein any portion sent through the port has the network condition simulated to simulate operation of the computing device with the network condition;
during playback of the video content at the client, receiving, at the traffic shaping service, a request for a portion in the set of portions from the client;
determining a port associated with the request for the portion; and
sending the portion through the determined port, wherein the network condition is applied to the portion via the software simulation to simulate operation of the computing device with the network condition.

11. The non-transitory computer-readable storage medium of claim 10, wherein setting the network condition comprises:
storing information indicating the network condition to apply to the port, wherein the stored information is used when sending the portion through the port.

12. The non-transitory computer-readable storage medium of claim 11, wherein storing information comprises running a script to set the network condition in a routing table associated with the port.

13. The non-transitory computer-readable storage medium of claim 10, further operable for:
for each of the set of portions, performing:
determining a rule associated with a portion; and
adjusting the playlist to identify the dynamically allocated port associated with the rule for the portion; and
sending the adjusted playlist to the client.

14. The non-transitory computer-readable storage medium of claim 13, wherein:
the request for the portion received at the traffic shaping service identifies the port associated with the rule to apply to the portion, and
the service sends the portion through the identified port based on the port being identified in the request for the portion.

15. The non-transitory computer-readable storage medium of claim 10, further operable for:
requesting a first set of portions from the set of portions from a content delivery network;
receiving the first set of portions from the content delivery network; and
sending the first set of portions through determined ports, wherein the first set of portions are sent from the traffic shaping service to the client and a second set of portions not in the first set of portions is sent to the client from the content delivery network without being sent to the traffic shaping service.

16. The non-transitory computer-readable storage medium of claim 15, wherein the second set of portions do not have a respective network condition simulated via the software simulation.

17. The non-transitory computer-readable storage medium of claim 15, wherein a portion in the first set of portions is associated with a rule that returns an error code instead of the portion.

18. The non-transitory computer-readable storage medium of claim 10, wherein receiving the request comprises receiving the request at a main port, wherein the main port proxies the request to the port associated with the request.

19. A system comprising:
one or more computer processors; and
a computer-readable storage medium comprising instructions, that when executed, control the one or more computer processors to be configured for:
retrieving a playlist for a video stream of video content for a client, wherein the playlist is for a plurality of portions of video content for the video stream;
determining, at a traffic shaping service, a set of rules for the playlist for a set of portions in the plurality of portions, wherein each rule is associated with a respective network condition to simulate operation of a computing device with the respective network condition via software simulation without instrumenting hardware of the computing device to operate differently to provide the respective network condition;

for each rule, performing:
- dynamically allocating a port; and
- setting a network condition to apply to the port according to the rule, wherein any portion sent through the port has the network condition simulated to simulate operation of the computing device with the network condition;

during playback of the video content at the client, receiving, at the traffic shaping service, a request for a portion in the set of portions from the client;

determining a port associated with the request for the portion; and sending the portion through the determined port, wherein the network condition is applied to the portion via the software simulation to simulate operation of the computing device with the network condition.

20. The system of claim 19, wherein setting the network condition comprises:
- storing information indicating the network condition to apply to the port, wherein the stored information is used when sending the portion through the port.

* * * * *